US007583962B2

(12) United States Patent
Nelson et al.

(10) Patent No.: US 7,583,962 B2
(45) Date of Patent: Sep. 1, 2009

(54) ADJACENT-CELL ASSISTED REDUNDANCY FOR WIRELESS COMMUNICATION NETWORKS

(75) Inventors: Paul Gilbert Nelson, Frisco, TX (US); Baowei Ji, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 11/387,600

(22) Filed: Mar. 23, 2006

(65) Prior Publication Data

US 2007/0225028 A1 Sep. 27, 2007

(51) Int. Cl.
*H04W 24/00* (2009.01)
*H04W 28/08* (2009.01)
*H04W 72/00* (2009.01)

(52) U.S. Cl. ........................ 455/424; 455/453; 455/561

(58) Field of Classification Search ....................... None
See application file for complete search history.

(56) References Cited

U.S. PATENT DOCUMENTS 5,551,056 A * 8/1996 Koponen et al. ............... 455/8
5,852,778 A * 12/1998 Labedz ....................... 455/423
5,861,844 A * 1/1999 Gilmore et al. ......... 455/423 X
5,991,629 A * 11/1999 Agrawal et al. ............. 455/446
6,907,237 B1 * 6/2005 Dorenbosch et al. .... 455/423 X
6,954,444 B2 * 10/2005 Ji et al. ....................... 370/331
2007/0076731 A1 * 4/2007 Manjeshwar et al. ........ 370/408

* cited by examiner

*Primary Examiner*—Philip J Sobutka

(57) ABSTRACT

Included in a wireless communication network having a plurality of base stations capable of communicating with a plurality of mobile stations located in a coverage area of the network is a redundancy controller. The redundancy controller is capable of detecting a failure in one of the base stations. The redundancy controller is also capable of causing one of the other base stations to use a predetermined amount of its total communication capacity to communicate with mobile stations in a coverage area of the failed base station. The redundancy controller may select all base stations having coverage areas nearby to that of the failed base station and cause all those base stations to use an amount of their total communication capacity to communicate with mobile stations in the coverage area of the failed base station.

21 Claims, 3 Drawing Sheets

ADJACENT-CELL ASSISTED REDUNDANCY FOR WIRELESS COMMUNICATION NETWORKS

TECHNICAL FIELD OF THE INVENTION

The present disclosure is directed, in general, to wireless communication networks and, more specifically, to wireless communication networks providing wireless communication with reduced need for redundant equipment at base stations of the network.

BACKGROUND

One means of improving reliability of a wireless communication network is to provide backup modules or subsystems at each base station. When a piece of equipment in use fails, a backup piece of equipment may readily be switched into operation to minimize any loss of service caused by the failure. While such a design improves reliability, it also increases the cost and complexity of the base station.

Succeeding generations of code-division multiple access (CDMA) and time-division multiple access (TDMA) wireless communication standards and increasing bitrate demands of CDMA and TDMA wireless users are causing wireless service providers to shrink the size of wireless cells. As a result, increasing numbers of base stations are required to cover a given geographical region, with corresponding increases in the amount of redundant equipment installed to improve reliability. The increases in cost and complexity caused by the use of backup equipment are thus aggravated by the increases in numbers of installed base stations.

SUMMARY

The method and system of the present disclosure provide communication with mobile stations in a wireless communication network with reduced need for redundant equipment at base stations of the network.

More specifically, aspects of the present disclosure may be found in a wireless communication network that includes a plurality of base stations capable of communicating with a plurality of mobile stations located in a coverage area of the network. The network also includes a redundancy controller that is capable of detecting a failure of one of the base stations. The redundancy controller is also capable of causing one of the other base stations to use a predetermined amount of its total communication capacity to communicate with mobile stations in a coverage area of the failed base station.

Other aspects of the disclosure may be found in a redundancy controller for use in a wireless communication network having a plurality of base stations capable of communicating with a plurality of mobile stations located in a coverage area of the network. The redundancy controller is capable of detecting a failure of one of the base stations. The redundancy controller is also capable of causing one of the other base stations to use a predetermined amount of its total communication capacity to communicate with mobile stations in a coverage area of the failed base station.

Yet other aspects of the disclosure may be found in a method of operating a wireless communication network, the network comprising a plurality of base stations capable of communicating with a plurality of wireless stations located in a coverage area of the network. The method includes detecting a failure of one of the base stations. The method also includes causing one of the other base stations to use a predetermined amount of its total communication capacity to communicate with mobile stations in a coverage area of the failed base station.

The foregoing has outlined rather broadly the features and technical advantages of the subject matter disclosed so that those skilled in the art may better understand the detailed description that follows. Additional features and advantages will be described hereinafter that form the subject of the claims. Those skilled in the art will appreciate that they may readily use the conception and the specific embodiment(s) disclosed as a basis for modifying or designing other structures for carrying out the same purposes identified herein, as well as other purposes. Those skilled in the art will also realize that such equivalent constructions do not depart from the spirit and scope of the disclosed subject matter in its broadest form.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
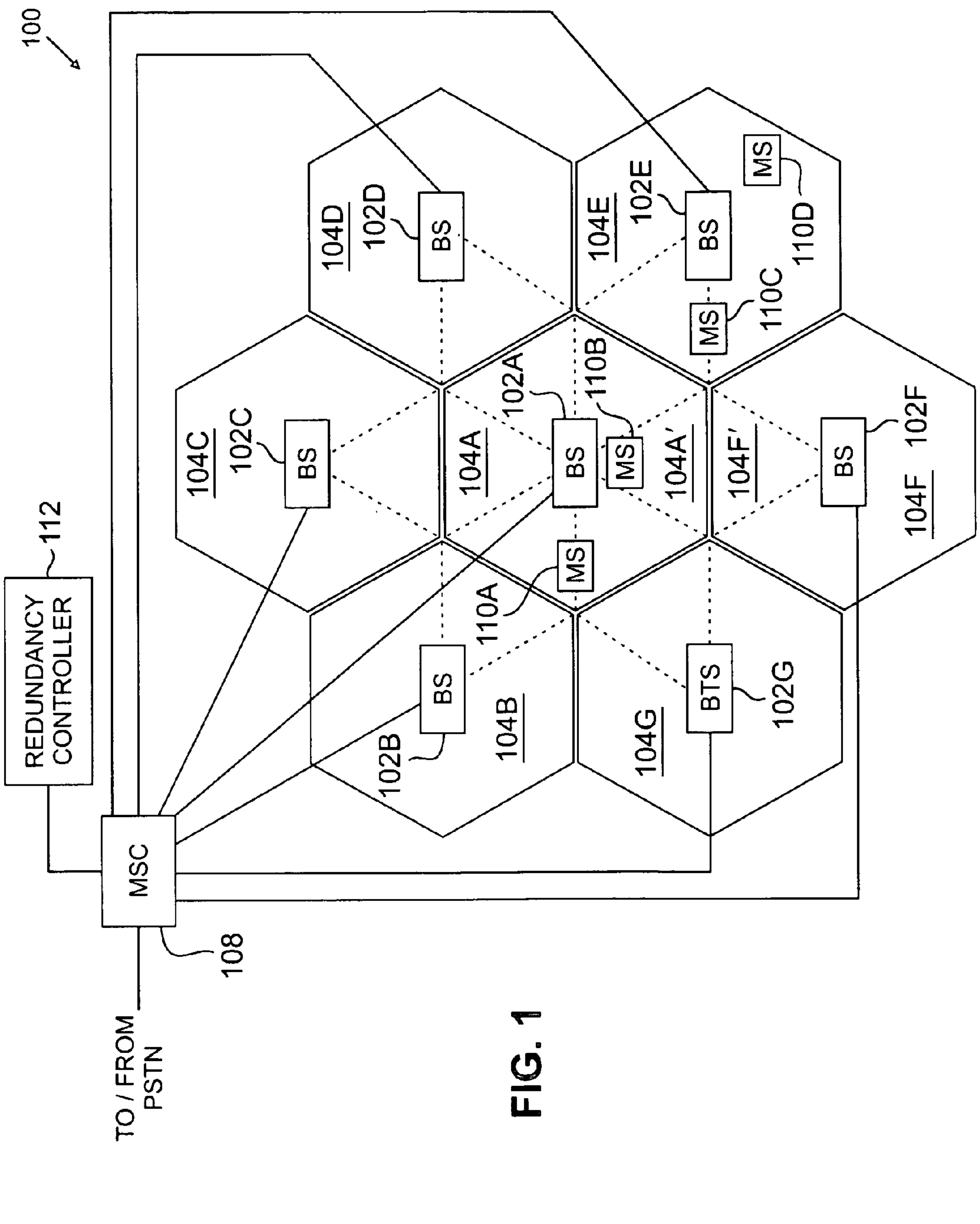
FIG. 1 depicts a schematic view of a wireless communication network according to one embodiment of the present disclosure.
Figure 2:
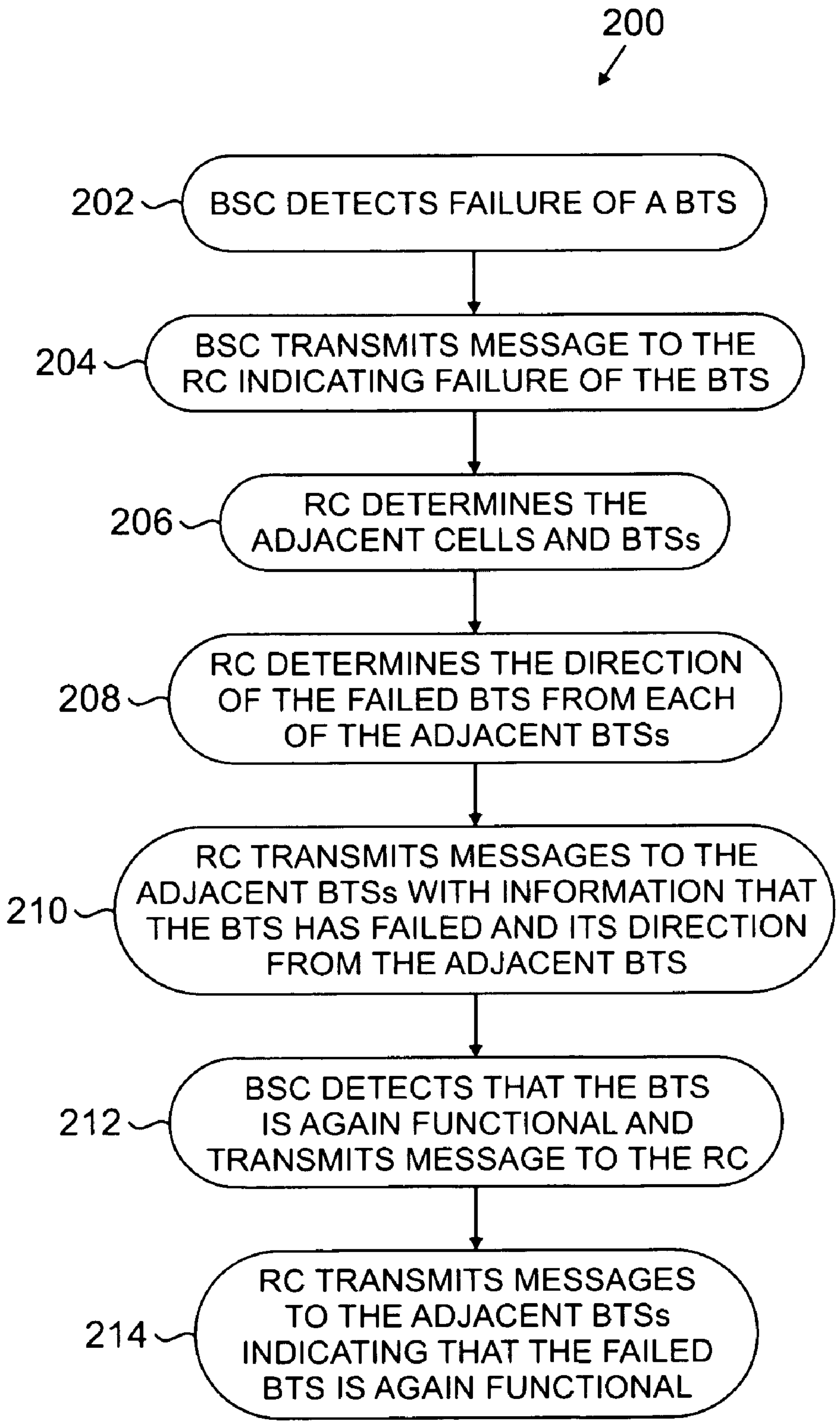
FIG. 2 depicts a series of steps that a wireless communication network may perform in responding to a failure of a base station in the network, according to one embodiment of the present disclosure.
Figure 3:
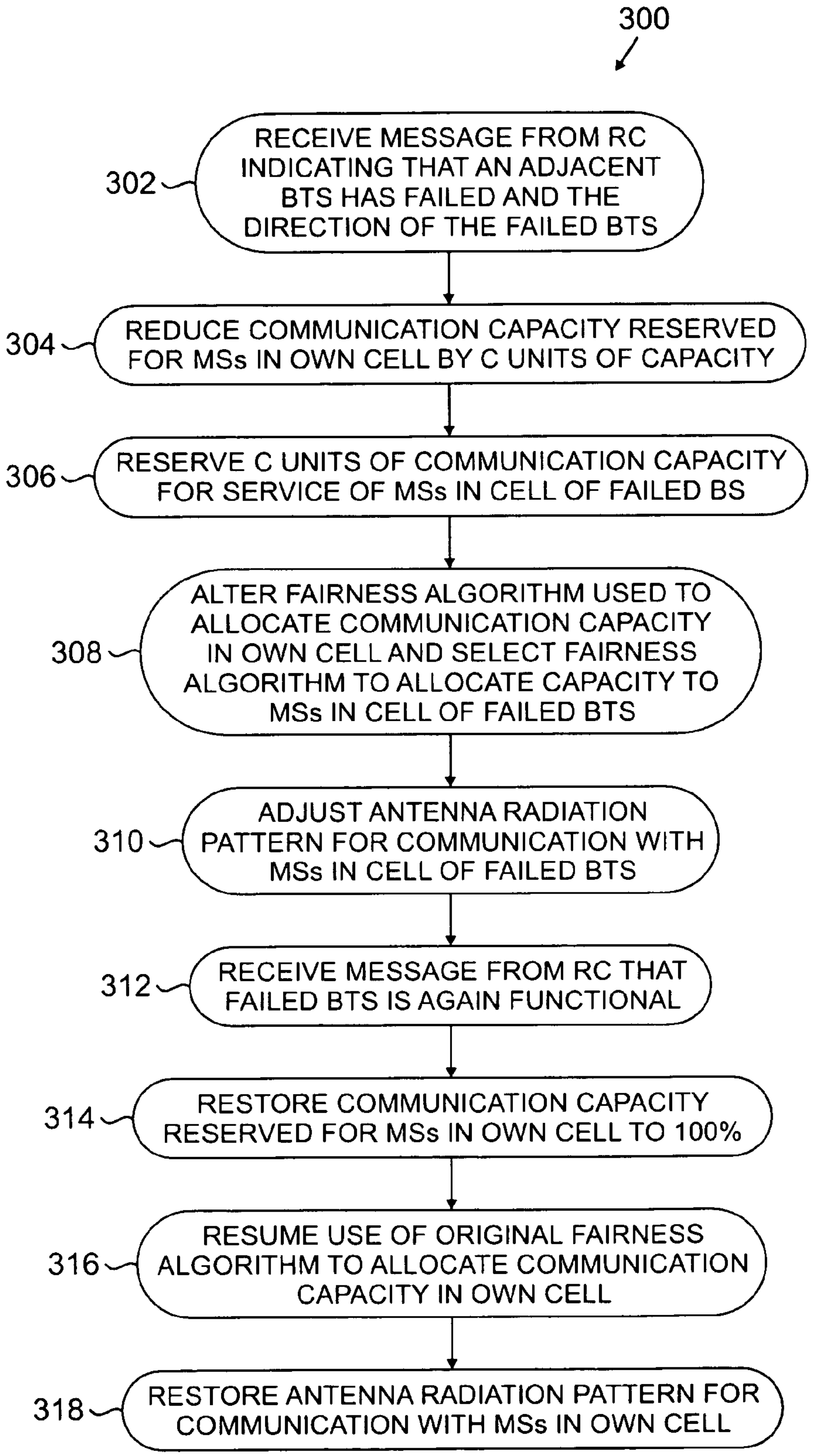
FIG. 3 depicts a series of actions that a base station in a wireless communication network may perform upon receipt of a message indicating the failure of another base station in the network, according to one embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

FIG. 1 depicts a schematic view of a wireless communication network according to one embodiment of the present disclosure capable of providing wireless communication with mobile stations in the network, with reduced need for redundant equipment at base stations (BSs) of the network. Wireless communication network 100 includes BSs 102A-G providing wireless communication services to mobile stations within their corresponding coverage areas, or cells, 104A-G. A BS may comprise a base transceiver station (BTS) coupled to a base station controller (BSC). A BTS comprises one or more RF transceivers, antennas, and other electrical equipment. A base station controller is a device that manages wireless communications resources, including the BTSs, for specified cells within a wireless communications network.

It will be understood that a base station may comprise a single BSC and one or more BTSs, collocated in the center of a coverage area, with antennas radiating outward to the edges of the coverage area. A base station may alternatively comprise a single BSC and a plurality of BTSs in a corresponding plurality of locations, with individual BTS coverage areas joining to form the BS coverage area.

The base stations 102A-G are coupled to a mobile switching center (MSC) 108. The BSs 102A-G transfer voice and data signals between each other and the public switched telephone network (PSTN) via the MSC 108. Also coupled to the MSC 108 is a redundancy controller 112, whose operation will be discussed with regard to FIG. 2.

While FIG. 1 shows the redundancy controller 112 as a separate device coupled to the MSC 108, it will be understood that in another embodiment of the present disclosure, the redundancy controller may be coupled to one or more of the base stations 102A-G. In yet other embodiments, its functionality may be provided by the MSC 108 itself or by one or more of the base stations 102A-G.

In FIG. 1, mobile stations 110A and 110B are located within cell, or coverage area, 104A and may be receiving wireless services from the BS 102A. Similarly, mobile stations 110C and 110D are located within cell 104E and may be receiving wireless services from the BS 102E. Were BS 102A to fail, in a prior art wireless system, redundant equipment at the BS 102A would be switched into operation to continue providing wireless services to the mobile stations 110A and 110B.

Absent backup equipment at the failed BS 102A, the mobile stations 110A and 110B would have to establish communications with one of the BSs 102B-G to obtain wireless service from the wireless communication network 100. However, one means employed by BSs to reduce interference in nearby cells is to reduce the power of their pilot signals to cover only their individual cells. Because of this, the mobile stations 110A and 110B may be unable to receive a pilot signal from any BS other than the BS 102A and thus be blocked from obtaining wireless service.

FIG. 2 depicts a series of steps 200 that the wireless communication network 100 may perform in responding to the failure of the BS 102A, in one embodiment of the present disclosure. When the BS 102A serving the cell 104A fails, a base station controller (BSC) associated with the BS 102A may detect the failure in step 202. Where a BTS associated with the BS 102A fails, the BSC or another piece of equipment associated with the BS 102A may detect the failure. In step 204, the piece of equipment sensing the failure may transmit information to the redundancy controller (RC) 112 indicating that the BS 102A has failed. Where the BSC associated with the BS 102A fails, the MSC 108 may detect the failure in the step 202 and transmit the message to the redundancy controller 112 in the step 204.

The redundancy controller 112 may have access to a system map or other information permitting it to determine, in step 206, that the cells 104B-G, served by the BSs 102B-G, respectively, are nearby to the cell 104A, or are adjacent to the cell 104A. In step 208, the redundancy controller 112 may also determine for each of the BSs 102B-G which of its sectors faces the cell 104A, or a direction of the BS 102A. In step 210, the redundancy controller 112 may transmit 'failure detected' messages to the BSs 102B-G with information indicating that a BS serving a nearby cell has failed. The messages sent in the step 210 may further include individual information for each of the BSs 102B-G indicating which of their sectors faces the failed cell, or the direction of the failed cell from the BS.

Subsequently, in step 212, the BSC 102A may detect that the BS 102A is again functional and transmit a message to the redundancy controller 112 indicating that change in status. Alternatively, as discussed above, another piece of equipment associated with the BS 102A may detect this change in status, or the MSC 108 may detect the return to functionality of the BS 102A. In step 214, the redundancy controller 112 may transmit a 'failure cleared' message with information that the failed BS 102A is again functional. This 'failure cleared' message may be sent to the BSs 102B-G that were originally sent the 'failure detected' message.

FIG. 3 depicts a series of actions 300 that one of the BSs 102B-G may perform upon receipt of a 'failure detected' message such as that sent by the redundancy controller 112 in the step 210 of FIG. 2. In step 302, the BS 102F, for example, may receive a 'failure detected' message from the redundancy controller 112, indicating that the BS 102A has failed. The message received in the step 302 may also include information indicating a sector 104F' facing the cell 104A or a direction of the BS 102A relative to the BS 102F.

In response to the 'failure detected' message, in step 304, the BS 102F may reduce the communication capacity, or power, that it reserves for mobile stations (MSs) in its own cell 104F by a predetermined amount, for example C bits per second (bps). The value of C may be chosen to be a predetermined percentage of the total power of the BS 102F. It will be understood that, instead of bps, the units of C could be units of power or Walsh codes in a CDMA system, or units of time slots in a TDMA system.

The amount of communication capacity thus made available may then be reserved, in step 306, for providing wireless service from the BS 102F to MSs in the cell 104A of the failed BS 102A. The BS 102F may increase the pilot signal and user data signals transmitted in the sector 104F' such that communication is possible with MSs in the cell 104A. The BS 102F may make further adaptations to its operation based upon the antenna type in use at the BS 102F, as discussed with reference to step 310 below.

Additionally, also in response to the 'failure detected' message, in step 308, the BS 102F may alter the fairness algorithm used to allocate capacity to the MSs in the cell 104F. This alteration may comprise an adjustment to the weighting parameters of an algorithm already in use, or a change to a different algorithm. Also in the step 308, the BS 102F may select a fairness algorithm to use in allocating the power reserved in the step 306 for providing wireless service to MSs in the cell 104A.

In the step 310, the BS 102F may adjust its antenna radiation pattern to facilitate communication with MSs in the cell 104A. The sector 104F' facing the failed cell 104A may be identified in the message received in the step 302. If the received message instead specifies the direction of the BS 104A from the BS 104F, then the BS 104F' may determine for itself which of its sectors faces the failed cell 104A. Such an adjustment in antenna radiation pattern would have an effect of enabling the BS 102F to communicate beyond the sector 104F' into at least a sector 104A' and perhaps other sectors of the cell 104A.

In each of the cells 104B-E and 104G, a sector analogous to the sector 104F' (that is, facing the failed cell 104A) is depicted, indicating how the BSs 102B-E and 102G might adjust their antenna radiation patterns according to one embodiment of the present disclosure. The adjustment made may depend on what type of antenna a BS is equipped with.

A sectored antenna typically includes three or six antenna elements, each having a fixed beam angle of 120 or 60 degrees, respectively. The antenna elements may be arranged around a centrally located BS tower to fully cover the BS cell. Typically, each antenna element is coupled to a separate RF transceiver. If the BS 102F comprises a sectored antenna, the BS 102F may simply increase the transmitter power and receiver sensitivity of the RF transceiver coupled to the antenna element serving the sector 104F'.

A switched-beam antenna is similar to a sectored antenna, but it comprises a larger number of antenna elements of narrower fixed beam width. Furthermore, a switched-beam antenna is typically capable of coupling a single RF transceiver to a desired one or more of the antenna elements. If the BS 102F comprises a switched-beam antenna, it may increase the transmitter power and receiver sensitivity of the RF transceiver only when coupled to antenna elements serving the sector 104F' and facing the failed cell 104A.

An adaptive-array antenna includes multiple regular antenna elements with a signal processing capability to automatically optimize the radiation and reception pattern of the antenna in response to the signal environment. An adaptive array antenna may precisely direct a signal to a user without contributing to interference outside the main lobe of the radiated signal. Similarly, such an antenna may suppress interference in a received signal by weighting out signals from outside the main lobe.

If the BS 102F comprises an adaptive array antenna, it may respond to the 'failure detected' message received in the step 308 by transmitting a pilot signal with a 60 degree beam width to cover sector 104F' and having an increased signal strength, in order to reach MSs in the cell 104A as well as those in the sector 104F'. Similarly, when providing wireless service to the MS 110B, the BS 102F may generate a beam of higher power and narrower beam width than would be used to communicate with a MS in the sector 104F'.

Subsequently, in step 312, the BS 102F may receive a 'failure cleared' message from the redundancy controller 112. In response to this message, in step 314, the BS 102F may restore the communication capacity reserved for MSs in its own cell to full capacity, no longer reserving any capacity for MSs in the cell 104A. Furthermore, if the BS 102F altered its fairness algorithm in the step 308, it may resume use of its original fairness algorithm in step 316. Finally, in step 318, the BS 102F may return to using an antenna radiation pattern intended to communicate solely with MSs within the cell 104F.

A second scenario illustrates the functionality of another embodiment of the present disclosure. The failure in the BS 102A may affect only its ability to communicate with MSs in the sector 104A', while still being able to communicate with MSs in all other sectors of the cell 104A. In this situation, information indicating which of the sectors of BS 102A is affected by its failure may be communicated to the redundancy controller 112. In turn, the redundancy controller 112 may send a 'failure detected' message only to the BS 102F. In response, the BS 102F may modify its operation in one or more of the ways described above with reference to FIG. 3, in order to communicate with MSs in the sector 104A'.

In yet another embodiment of the present disclosure, the redundancy controller may also respond to the information that the BS 102A is unable to communicate with MSs in the sector 104A' by sending a message to the BS 102A, causing it to modify its behavior. If the BS 102A has an adaptive-array antenna, it may respond to the message by expanding the coverage of the antennas serving the sectors on either side of the sector 104A'. In this way, those two antennas could cover parts of the sector 104A' as well as their own sectors. Similarly, the BS 102A may increase the power to those two antennas in order to provide communication capacity to MSs in the sector 104A', or it may modify a fairness algorithm used to allocate communication capacity to MSs in the cell 104A.

One motivation for installing backup base station equipment in a cell might be to reduce a possibility that a MS in the cell will be blocked from obtaining wireless service should the base station suffer an equipment failure. In a wireless communication network according to the present disclosure, the probability P that the MS 110B in the cell 104A will be blocked from obtaining wireless service from one of the nearby BSs 102B-G is a function of C, the amount of communication capacity reserved by each nearby base station. The relationship between P and C may be explained as follows.

If all nearby BSs are operating, the probability that the MS 110B will be blocked is $$\max\{0,(1-6*C)\}.$$

That is, if C is 1/6 or greater, the MS 110B will not be blocked. However, if i of the nearby BSs have also failed, the probability that the MS 110B will be blocked is $$\max\{0,(1-(6-i)*C)\}.$$

If the probability that a base station works properly is $p_{1s}$, and the probability that a base station fails is $p_{1f}$, then the probability that i of the nearby BSs fail and the MS 110B is blocked is:

$$P_i = \binom{6}{i} p_{1s}^{6-i} p_{1f}^{i} \max\{0,\ (1-(6-i)*C)\},\ i = 0, 1, \ldots, 6,$$

where $$\binom{n}{k} = \frac{n!}{k!(n-k)!},\ k = 0, 1, \ldots, n.$$

Thus, the overall probability that the MS 110B will be blocked is the summation of the values of $P_i$ for all possible values of i:

$$P = \sum_{i=0}^{6} P_i = \sum_{i=0}^{6} \binom{6}{i} p_{1s}^{6-i} p_{1f}^{i} \max\{0,\ (1-(6-i)*C)\}.$$

Assume for the purposes of this example that the BSs 102B-G operate with a reliability of 99.9%. That is, $p_{1s}$=0.999 and $p_{1f}$=0.001. Then, in a scenario where the nearby cells reserve C=15% of their capacity to serve the MSs of the cell 104A, P=0.1009 and almost 90% of the capacity of the failed BS 104A may be recovered. Where the nearby cells reserve C=20% of their capacity, $P=2.996*10^{-6}$, which is equivalent to having almost two backup BSs in the cell 104A.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication network, comprising:

a plurality of base stations capable of communicating with a plurality of mobile stations located in a coverage area of the network; and a redundancy controller capable of:

detecting a failure of one of said plurality of base stations;

causing a second one of said plurality of base stations to use a first fairness algorithm for allocating a predetermined amount of a total communication capacity of said second base station to mobile stations in said coverage area of said failed base station; and causing said second base station to use said predetermined amount of said total communication capacity of said second base station to communicate with said mobile stations in said coverage area of said failed base station.

2. The wireless communication network as set forth in claim 1, wherein said second base station uses a first antenna radiation pattern to communicate with mobile stations in a coverage area of said second base station, and wherein said redundancy controller is further capable of causing said second base station to use a second antenna radiation pattern to communicate with said mobile stations in said coverage area of said failed base station.

3. The wireless communication network as set forth in claim 2, wherein said redundancy controller is further capable of:

causing said second base station to use a second fairness algorithm to allocate a remaining communication capacity of said second base station to said mobile stations in said coverage area of said second base station.

4. The wireless communication network as set forth in claim 1, wherein said redundancy controller is further capable of:

detecting a partial failure of said failed base station; and selecting as said second base station one of said plurality of base stations capable of communication with mobile stations in a coverage area of said failed base station affected by said partial failure.

5. The wireless communication network as set forth in claim 1, wherein said second base station has a coverage area adjacent to said coverage area of said failed base station.

6. The wireless communication network as set forth in claim 1, wherein said redundancy controller is further capable of:

selecting all base stations of said plurality of base stations having coverage areas nearby to said coverage area of said failed base station; and causing all selected base stations to use a predetermined amount of a total communication capacity of said second base station to communicate with mobile stations in said coverage area of said failed base station.

7. The wireless communication network as set forth in claim 1, wherein said failure of said failed base station is a partial failure, and wherein said redundancy controller is capable of causing said failed base station to alter an antenna radiation pattern to communicate with mobile stations in a coverage area of said failed base station affected by said partial failure.

8. For use in a wireless communication network, the network comprising a plurality of base stations capable of communicating with a plurality of mobile stations located in a coverage area of the network, a redundancy controller capable of:

detecting a failure of one of said plurality of base stations;

causing a second one of said plurality of base stations to use a first fairness algorithm for allocating a predetermined amount of a total communication capacity of said second base station to mobile stations in said coverage area of said failed base station; and causing said second base station to use said predetermined amount of said total communication capacity of said second base station to communicate with said mobile stations in said coverage area of said failed base station.

9. The redundancy controller as set forth in claim 8, wherein said second base station uses a first antenna radiation pattern to communicate with mobile stations in a coverage area of said second base station, and wherein said redundancy controller is further capable of causing said second base station to use a second antenna radiation pattern to communicate with said mobile stations in said coverage area of said failed base station.

10. The redundancy controller as set forth in claim 9, wherein said redundancy controller is further capable of:

causing said second base station to use a second fairness algorithm to allocate a remaining communication capacity of said second base station to said mobile stations in said coverage area of said second base station.

11. The redundancy controller as set forth in claim 8, wherein said redundancy controller is further capable of:

detecting a partial failure of said failed base station; and selecting as said second base station one of said plurality of base stations capable of communication with mobile stations in a coverage area of said failed base station affected by said partial failure.

12. The redundancy controller as set forth in claim 8, wherein said second base station has a coverage area adjacent to said coverage area of said failed base station.

13. The redundancy controller as set forth in claim 8, wherein said redundancy controller is further capable of:

selecting all base stations of said plurality of base stations having coverage areas nearby to said coverage area of said failed base station; and causing all selected base stations to use a predetermined amount of a total communication capacity of said second base station to communicate with mobile stations in said coverage area of said failed base station.

14. The redundancy controller as set forth in claim 8, wherein said failure of said failed base station is a partial failure, and wherein said redundancy controller is capable of causing said failed base station to alter an antenna radiation pattern to communicate with mobile stations in a coverage area of said failed base station affected by said partial failure.

15. A method of operating a wireless communication network, the network comprising a plurality of base stations capable of communicating with a plurality of wireless stations located in a coverage area of the network, the method comprising:

detecting a failure of one of the plurality of base stations;

causing a second one of said plurality of base stations to use a first fairness algorithm for allocating a predetermined amount of a total communication capacity of said second base station to mobile stations in said coverage area of said failed base station; and causing said second base station to use said predetermined amount of said total communication capacity of the second base station to communicate with said mobile stations in said coverage area of the failed base station.

16. The method as set forth in claim 15, wherein the second base station uses a first antenna radiation pattern to communicate with mobile stations in a coverage area of the second base station, the method further comprising causing the second base station to use a second antenna radiation pattern to communicate with the mobile stations in the coverage area of the failed base station.

17. The method as set forth in claim 16, further comprising:

causing the second base station to use a second fairness algorithm to allocate a remaining communication capacity of the second base station to the mobile stations in the coverage area of the second base station.

18. The method as set forth in claim 15, further comprising:

detecting a partial failure of the failed base station; and selecting as the second base station one of the plurality of base stations capable of communication with mobile stations in a coverage area of the failed base station affected by the partial failure.

19. The method as set forth in claim 15, wherein the second base station has a coverage area adjacent to the coverage area of the failed base station.

20. The method as set forth in claim 15, further comprising:

selecting all base stations of the plurality of base stations having coverage areas nearby to the coverage area of the failed base station; and causing all selected base stations to use a predetermined amount of a total communication capacity of the second base station to communicate with mobile stations in a coverage area of the failed base station.

21. The method as set forth in claim 15, wherein the failure of the failed base station is a partial failure, the method further comprising causing the failed base station to alter an antenna radiation pattern to communicate with mobile stations in a coverage area of the failed base station affected by the partial failure.

* * * * *

UNITED STATES PATENT AND TRADEMARK OFFICE

CERTIFICATE OF CORRECTION

PATENT NO. : 7,583,962 B2
APPLICATION NO. : 11/387600
DATED : September 1, 2009
INVENTOR(S) : Nelson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Fourteenth Day of September, 2010

David J. Kappos

*Director of the United States Patent and Trademark Office*